United States Patent [19]

Siller

[11] 4,030,711
[45] June 21, 1977

[54] METHOD AND APPARATUS FOR THE SURFACE HARDENING OF THE INNER SURFACE OF TUBE BENDS

[75] Inventor: Vinzenz Siller, Hamburg, Germany

[73] Assignee: Esser-Werke GmbH vorm. Westmontan-Werke, Warstein, Sauerland, Germany

[22] Filed: May 29, 1975

[21] Appl. No.: 581,746

[30] Foreign Application Priority Data

| May 31, 1974 | Germany | 2426580 |
| May 31, 1974 | Germany | 2426579 |
| Aug. 10, 1974 | Germany | 2438558 |

[52] U.S. Cl. .............................. 266/123; 148/144; 148/151; 134/166 C; 432/224; 266/127; 266/261
[51] Int. Cl.² .......................................... C21D 9/08
[58] Field of Search ............... 148/20.3, 144, 151; 432/224, 225; 134/166 C, 167 C, 168 C, 169 C; 34/104, 105; 219/10.57; 266/4 R, 4 S, 6 R, 6 S, 114, 121, 123, 127, 261

[56] References Cited

UNITED STATES PATENTS

| 1,697,068 | 1/1929 | Kenney | 266/6 R X |
| 2,273,809 | 2/1942 | Kinzel | 266/4 S X |
| 2,318,145 | 5/1943 | Emery et al. | 266/4 R X |
| 2,482,945 | 9/1949 | Smith | 148/151 X |
| 3,043,317 | 7/1962 | Hursen | 266/6 R X |

*Primary Examiner*—Roy Lake
*Assistant Examiner*—Paul A. Bell
*Attorney, Agent, or Firm*—Toren, McGeady and Stanger

[57] ABSTRACT

Method and apparatus for flame hardening the inner wall surface of tube bends of a circular configuration wherein either a flame hardening burner is passed longitudinally through the internal cavity of a tube bend which is mounted in a fixed position, or alternatively the tube bend is moved over a stationary flame hardening burner. This relative movement between tube bend and burner is effected along a circular path corresponding to the longitudinal center line of the tube bend. Subsequently to flame hardening the heated inner wall surface of the tube bend is quenched with cooling water discharged from water sprinklers disposed downstream of the flame hardening zone. During flame hardening and quenching the tube bend is continuously maintained in positions such that the quenching water may leave the tube bend by gravity. The apparatus includes mounting means for the tube bend, the flame hardening burner and the associated cooling means and allows relative movement between the tube bend on the one hand and the burner and cooling means by means of a drive assembly.

12 Claims, 4 Drawing Figures

METHOD AND APPARATUS FOR THE SURFACE HARDENING OF THE INNER SURFACE OF TUBE BENDS

The present invention relates to method and apparatus for continuously surface hardening the inner surface of tube bends of a constant radius of curvature by means of flame hardening, with or without modifying the core properties of the material.

In the well-known method of flame hardening the layers adjacent the surface of a metallic workpiece are locally heated up to hardening temperture by means of gas and oxygen burners, without thereby modifying the core properties of the material. This method is employed for the surface hardening of shafts, rollers, durms, sleeves, teeth surfaces and the like as well as for the surface hardening of the inner surfaces of straight tubes or pipes.

It is also known to harden tube bends. When the hardening of tube bends is required, the tube bends are heated up to hardening temperature in a hardening or tempering furnace and subsequently quenched in a water bath or an oil bath. A major drawback of this method of hardening is that the obtained hardness is not equal throughout the workpiece. This irregularity is caused by the formation of bubbles within the tube bends and by nonuniform quenching. Further disadvantages of this method are a relatively high percentage of rejects and high costs associated with the furnace hardening operation. As far as Applicant is aware, it has never been tried to surface harden tube bends by flame hardening.

It is therefore an object of the present invention to provide novel and improved method and apparatus for the surface hardening of the inner surface of tube bends.

It is another object of the invention to provide method and apparatus of the above type which are highly economical.

It is a further object of the invention to provide method and apparatus of the above type allowing to selectively harden the outer circumferential region of tube bends since this outer region is subject to the heaviest wear during service of the tube bends. By selective hardening in this manner the tube bends retain a certain degree of elasticity in the region of their inner radius or circumference so that hardening strains may be compensated.

The present invention now proposes a method of continuously surface hardening the inner surface of tube bends of a constant radius of curvature by means of flame hardening wherein the tube bend is moved along a circular path of a radius corresponding substantially to the radius of curvature of the tube bend center line over stationary flame hardening means so that the stationary flame hardening means will be disposed within the inner cavity of the tube bend and the flames of the hardening means impinge on the inner tubular wall of the tube bend.

Thereby the tube bend may be moved from an uppermost initial position through a flame hardening zone located in a laterally displaced position which is lower than the uppermost initial position of the tube bend movement.

The invention furthermore proposes a method of continuously surface hardening the inner surface of tube bends of a constant radius of curvature by means of flame hardening, with or without modifying the core properties of the material wherein flame hardening means for generating flames adapted to impinge on the inner tubular wall of the tube bend is moved through the stationary tube bend along a circular path of a radius corresponding substantially to the radius of curvature of the tube bend center line.

In either case, i.e. during the circular movement of the tube bend with the flame hardening zone being kept stationary, or during the circular movement of the flame hardening zone with the tube bend being kept stationary, the outer surface of the tube bend is being cooled in the region of the inner tube bend portion radius.

The invention furthermore proposes a method wherein an inner lining of metallic materials having a continuous longitudinal slot extending along the inner arc radius of the tube bend inner wall surface is being shrink fitted onto the inner wall surface of the heated tube bend, and the tube bend is moved along a circular path of a radius corresponding substantially to the radius of curvature of the tube bend center line over stationary flame hardening means so that the stationary flame hardening means will be disposed within the inner cavity of the tube bend and the flames of the hardening means impinge on the inner tubular wall of the tube bend in the region of the outer circumferential tube bend radius. The flame hardening zone is designed so as not to obstruct the circular movement of the tube bend through an arc corresponding at least to the arc length of the tube bend. This method allows to harden the tube bend merely in the outer circumferential region which is generally subject to the severest wear in service. This hardening, therefore, achieves a substantial reduction of wear. This method of surface hardening the inner surface of tube bends thus ensures that the tube bends retain a certain degree of elasticity in the region of their inner circumference so that hardening strains may be compensated.

The present invention furthermore proposes an apparatus for continuously surface hardening the inner surfaces of tube bends of a constant radius of curvature by means of flame hardening, with or without modifying the core properties of the material. The proposed apparatus comprises a support frame, a shaft horizontally journalled in the support frame, a driving motor operatively coupled to the shaft, at least one mounting bracket assembly mounted on the shaft and extending in a direction perpendicular thereof. The mounting bracket assembly includes means for fastening a tube bend at one of its free ends. The free end of the mounting bracket assembly defines a circular path during rotary movement of the shaft. A stationary mounting bracket is connected at one end to the support frame and mounts at its opposite end a flame hardening burner. The flame hardening burner is adapted to be received within the internal cavity of a tube bend. The stationary mounting bracket is adapted to include the supply lines leading to the flame hardening burner and is of an arcuate configuration of a radius corresponding to the radius of the circular path described by the tube bend during its movement.

To allow flame hardening of tube bends of various arc radii, the mounting bracket assembly for mounting a tube bend includes a guide sleeve whereby the radial extension of the mounting bracket assembly is adjustable so as to adapt the same to the radius of curvature of the tube bend.

The mounting bracket assembly for a tube bend includes an angle of substantially 70° with a horizontal line in the plane of the circular path. The arcuate mounting bracket for the flame hardening burner extends through an arc of about 120°.

According to another characteristic of the present invention, the flame hardening burner may be releasably connected to the mounting bracket and may be replaced by a flame hardening burner of a different outer radius.

For cooling the inner circumferential bend portion, the mounting bracket assembly for a tube bend furthermore mounts a cooling-water pipe in the vicinity of the inner circumferential tube bend portion, and this cooling-water pipe includes a plurality of cooling-water discharge nozzles directed towards the inner arc tube bend surface.

According to another embodiment of the inventive apparatus, a shaft is journalled in a support frame and adapted to be rotated by a driving motor, a mounting rod is mounted on the shaft and extends in a direction perpendicular thereto, a mounting bracket is connected to the free end of the mounting rod, the flame hardening burner is connected to the free end of the mounting bracket, the mounting bracket is adapted to include the supply lines for the flame hardening burner, and a stationary mounting arm for attachment of a tube bend is connected to the support frame.

The method of flame hardening tube bends and the corresponding apparatus as proposed by the present invention allow the inner surface hardening of tube bends. When the tube bend moves along a circular path over a stationary flame hardening device, or when with a stationary tube bend the flame hardening device slowly moves through the tube bend the inner wall surface thereof will be hardened. By this inner hardening the tube bends are rendered wear-resistant for the service in conveyor pipes adapted for pneumatic or hydraulic conveyance of abrasive materials.

Further characteristics and the advantages of the present invention will be described in the following with reference to the embodiments shown in the appended drawings wherein FIG. 1 is a schematical lateral elevational view of an embodiment of the inventive tube bend flame hardening apparatus showing a tube bend adapted to be moved along a circular path and a stationary flame hardening burner;

Figure 1:
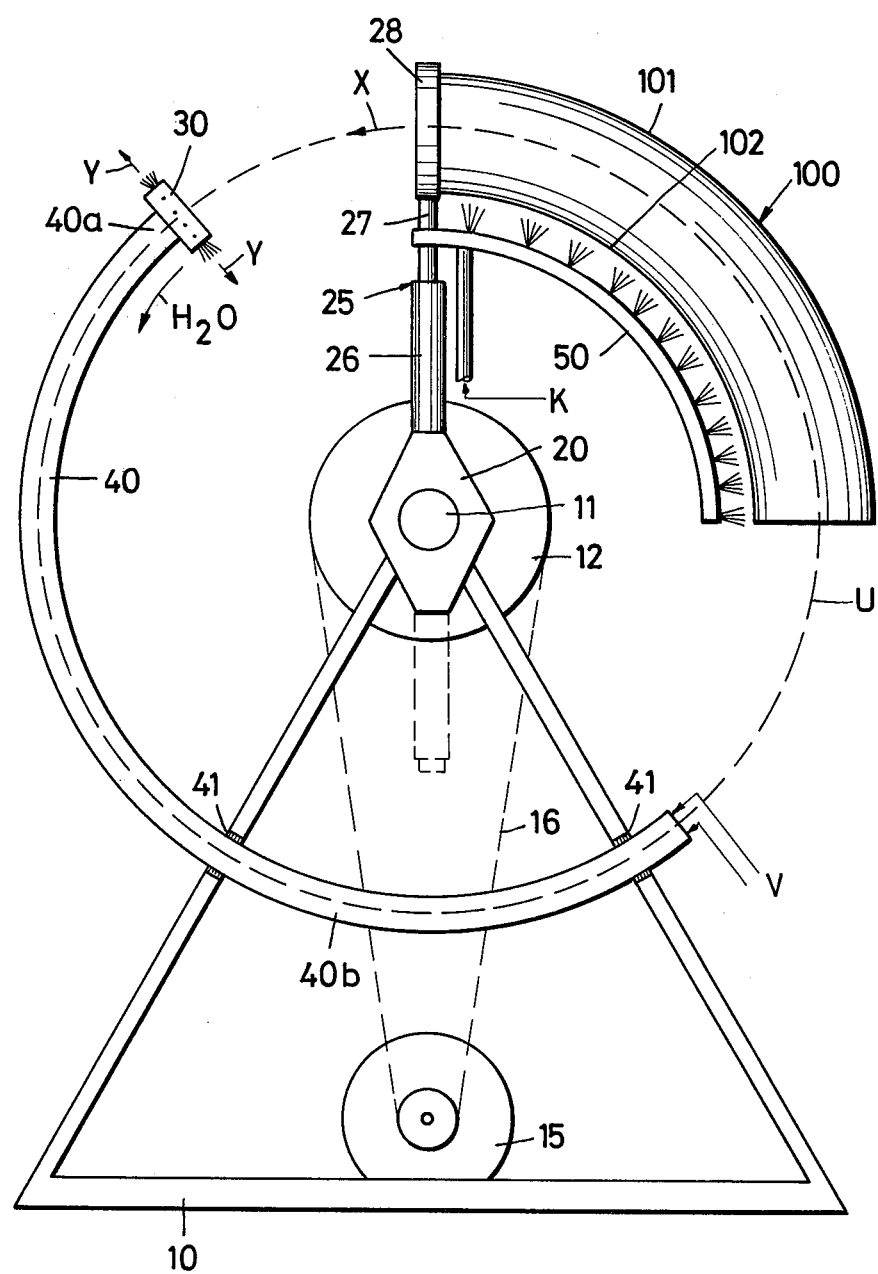

Referring first to FIG. 1, the embodiment of the surface hardening apparatus shown therein includes a support frame indicated generally by the reference numeral 10. A shaft 11 is journalled in horizontal direction in the support frame. The shaft 11 is operatively coupled to a driving motor 15. The drive arrangement consists of a drive pulley 12 connected to the shaft 11 and a driving belt 16 coupling the driving motor 15 to the drive pulley 12.

At one end of the shaft 11 is mounted a mounting plate 20 carrying at least one mounting bracket assembly 25 for holding a tube bend 100 intended to be flame hardened along its inner surface. To this end, the free end of the mounting bracket assembly 25 includes a clamp type fastener member 28 adapted to clamp the tube bend at one free end thereof. The longitudinal extension of the mounting bracket assembly 25 is adjustable in the radial direction. To this end the mounting plate 20 mounts a guide sleeve 26 in which is telescopically guided a mounting extension 27. The mounting extension 27 may be telescopically moved inwardly or outwardly with respect to the guide sleeve 26 and may be blocked in any desired extended position by suitable means not shown in detail. The drive shaft 11 serves to move the tube bend 100 along a circular path designated generally by U, in the direction of the arrow X. The outer circumferential arc tube bend portion is indicated at 101, and the inner circumferential arc tube bend portion at 102. The tube bend 100 may be moved along the circular path U of a radius corresponding to the mean radius of the tube bend, i.e. the radius of the tube bend center line. The longitudinal adjustability of the mounting bracket assembly 25 allows to adapt the apparatus to different tube bend radii so that for rotational movement of the shaft 11 in the direction of the arrow X the tube bend 100 will be moved along a path corresponding to its mean radius.

The mounting bracket assembly 25 is furthermore provided with a cooling device indicated at 50. This cooling device 50 is supplied as indicated at K with cooling-water for cooling the inner circumferential tube bend portion 102 of the tube bend 100. This cooling device 50 includes a pressurized water pipe of a configuration suitably adapted to the configuration of the inner circumferential arc tube bend portion 102 of the tube bend 100. The pressurized water pipe includes a plurality of cooling-water discharge nozzles facing the outer wall of the tube bend 100 opposite the inner circumferential portion 102 thereof.

In the circular path U of the tube bend 100 is stationarily mounted a flame hardening burner 30 which may be of a conventional design. The flame hardening burner 30 is mounted at the free end 40a of an arcuate mounting bracket 40 connected at its other end 40b to the support frame 10. The mounting bracket 40 may be connected in any suitable manner at 41 to the support frame 10. The arcuate mounting bracket 40 may consist of a pipe having a radius corresponding to the mean radius of the tube bend so that the arcuate longitudinal center line of the mounting bracket coincides with the circular path U. Within the mounting bracket 40 are arranged the supply lines V for the flame hardening burner 30. The flame hardening burner 30 includes a plurality of flame orifices radially spaced about its circumference. The flames are emitted from the burner in a radial direction as indicated by the arrows y and may therefore impinge on the inner surface of the tube bend 100 when the latter is being moved over the flame hardening burner 30. The dimensions of the flame hardening burner 30 are selected such that the flame hardening burner 30 slowly "passes" through the internal cavity of the tube bend 100 when the latter is being moved over the flame hardening means.

For surface hardening, the tube bend intended to be hardened is moved at a predetermined angular velocity over the flame hardening burner 30. For subsequent quenching, the flame hardening burner 30 includes a plurality of cooling-water discharge nozzles (not shown) which are connected to a likewise not shown pressurized water pipe for the supply of pressurized cooling-water. The flames emerge from the burner in radial directions and impinge almost perpendicularly on the inner surface of the tube bend. In order that the water discharged from the water sprinkler of the flame hardening burner 30 will run off downwardly, the tube bend 100 is moved over the flame hardening burner 30 from an initial uppermost position as shown in FIG. 1, and the flame hardening burner 30 is arranged in a sidewardly displaced position that is lower than the initial top position of the circular path of movement of the tube bend 100. The longitudinal extension of the arcuate mounting bracket 40 bearing at its upper end the flame hardening burner 30 corresponds at least to the longitudinal extension of the tube bend 100 so that the latter may be moved along its full length over the stationary flame hardening burner 30. The mounting bracket 40 bearing the flame hardening burner 30 may be releasably connected to the support frame 10 so as to allow the ready replacement thereof against mounting brackets of a different arc curvature or mounting a different type of flame hardening burner.

For compensating the different duration of flame treatment which is caused quite naturally by the smaller radius of curvature in the region of the inner circumferential tube bend portion 102, this region may be cooled externally by means of the cooling device 50 which discharges cooling-water against the outer surface of the tube bend inner circumference. This cooling results in the effect that this region will not be hardened and hardening strains will be compensated. Experience has shown that this inner circumferential tube bend portion is virtually not subject to any appreciable abrasive wear, quite in contrast to the inner surface portion in the region of the outer circumference of the tube bend.

The mounting plate 20 may likewise be provided with more than one mounting bracket assembly 25 in thus allowing in combination with associated correspondingly arranged flame hardening burners several tube bends to be surface hardened simultaneously at their inner surfaces.

Figure 2:
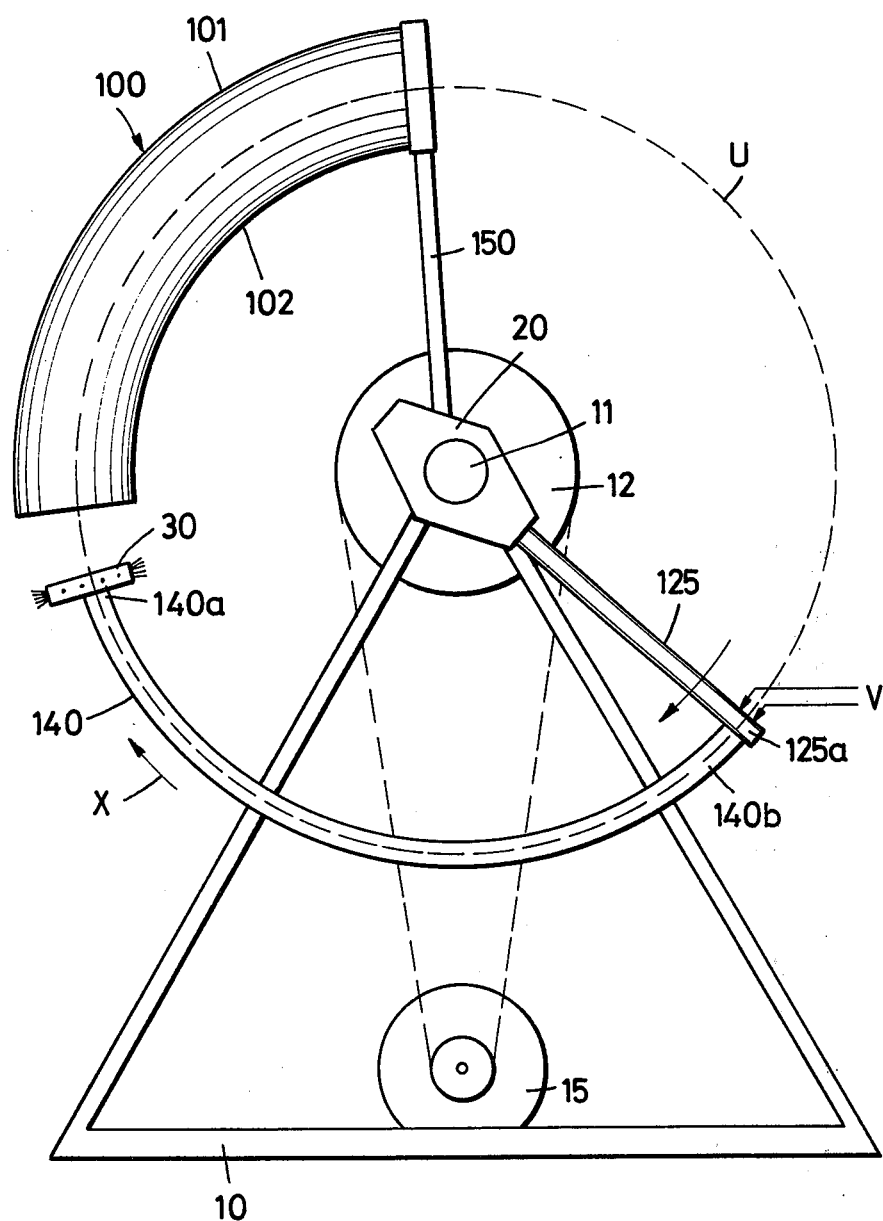
FIG. 2 is a schematical lateral elevational view of another embodiment of a tube bend flame hardening apparatus in accordance with the present invention showing a flame hardening burner adapted to be moved along a circular path corresponding to the mean radius of curvature of the tube bend and a stationary tube bend, looking into one of the tube bend.

Referring to FIG. 2, there is shown an embodiment in which the combination of a movable tube bend and a stationary flame hardening burner is reversed, i.e. the flame hardening burner may be moved along a circular path, and the tube bend is kept stationary. Toward this end, the tube bend 100 is attached at one of its free ends by a mounting arm 150 to the support frame 10 whereas the flame hardening burner 30 which is of a configuration similar to the embodiment of FIG. 1 is connected to the free end 140a of a mounting bracket 140. A mounting rod 125 is connected at its free end 125a to the other free end 140b of the mounting bracket 140. This mounting rod 125 is rigidly secured to the drive shaft 11, in a manner similar to the mounting bracket assembly 25 of FIG. 1. The mounting bracket 140 including the supply lines V for the flame hardening burner 30 may in this embodiment be moved along the circular path U in the direction of the arrow X, and the radius of this circular path U corresponds to the mean radius of the tube bend 100, i.e. to the radius of the tube bend center line. The flame hardening burner 30 may therefore be passed through the interior cavity of the tube bend 100 whereby the latter is kept stationary in the position shown in FIG. 2. In this position the cooling-water discharged by the water sprinkler of the flame hardening burner 30 may flow away in a downward direction so that no water may accumulate within the internal cavity of the tube bend. As in the embodiment of FIG. 1 the outer wall of the tube bend 100 may be cooled in the region of the inner circumference 102. The longitudinal extension of the mounting bracket 140 is somewhat greater than the longitudinal extension of the tube bend so that the flame hardening zone may be moved through the full length of the tube bend internal cavity.

Figure 3:
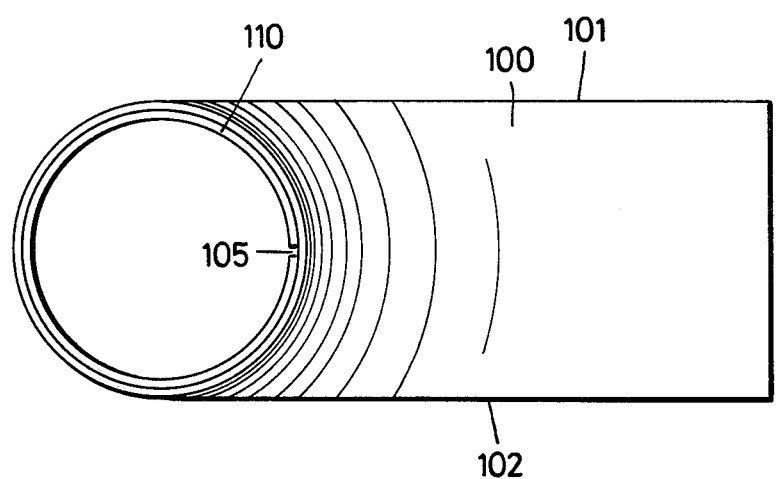
FIG. 3 is an elevational view of a composite material tube bend, looking into one end of the tube bend.

As shown in FIG. 3, the tube bend 100 may comprise an inner lining 110 of metallic materials. This inner lining 110 usually includes a continuous longitudinal slot 105 and is shrunk fit onto the inner wall surface of the tube bend 100. The shrink fitting of the lining is carried out in the heated condition of the tube bend 100 so that after cooling of the tube bend the inner lining 110 is pressfitted into the tube bend. The longitudinal slot 105 engages the inner wall surface of the tube bend substantially at the inner circumference or the inner arc tube bend portion. This method of fitting inner linings is not intended to be restricted merely to tube bends but may likewise be employed in the fitting of inner linings to straight pipes or tubes.

Figure 4:
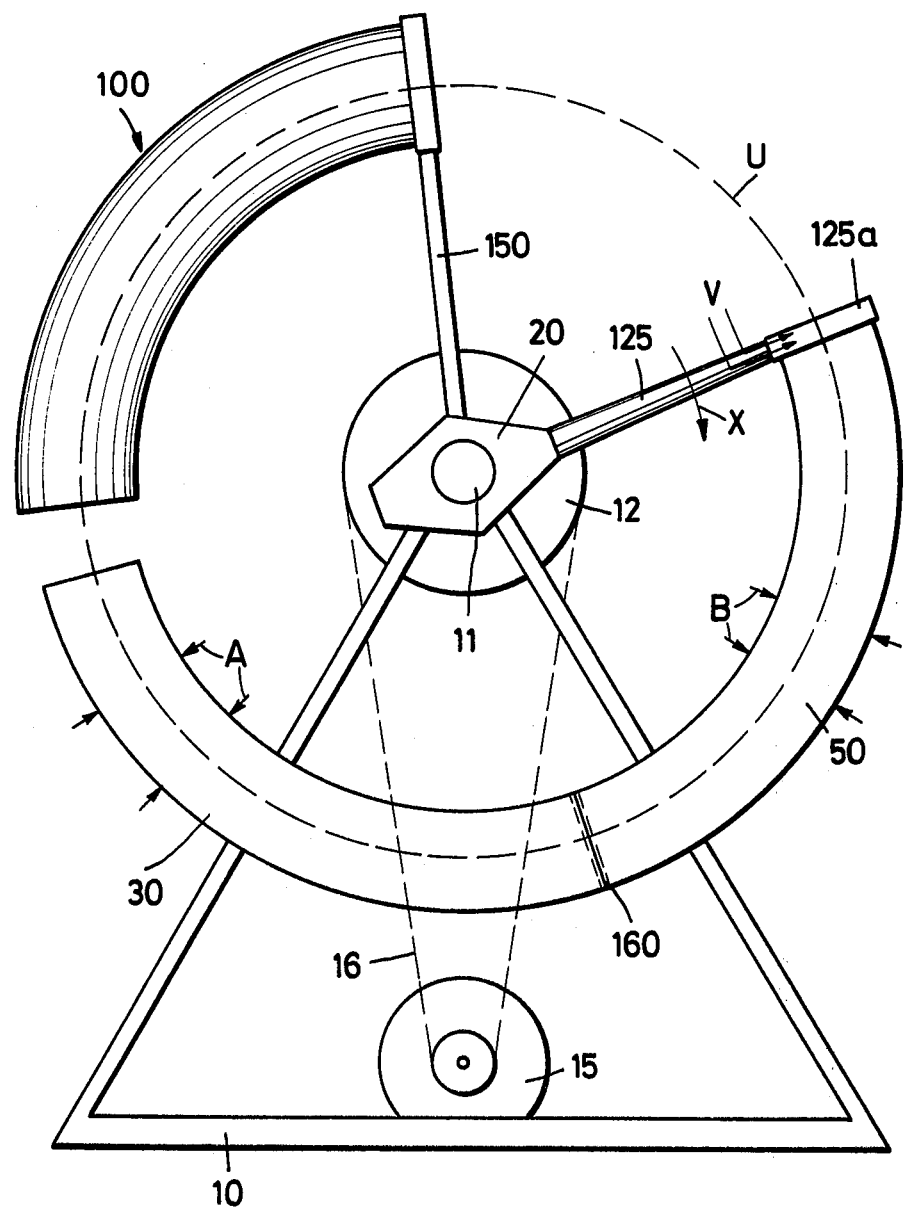
FIG. 4 is a schematical lateral elevational view of another embodiment of the inventive apparatus.

The embodiment of the flame hardening apparatus shown in FIG. 4 includes a support frame 10 in which a shaft 11 is horizontally jounalled. A driving motor 15 is operatively coupled to the shaft 11. This drive connection includes a drive pulley 12 and a driving belt 16.

A mounting arm 150 is rigidly secured to the support frame 10 and is adapted to attach at its free end a tube bend 100 intended to be hardened. The tube bend 100 is connected by one of its free ends to the free end of the mounting arm 150.

A mounting plate 20 is secured to one end of the shaft 11 and mounts a mounting rod 125. A cooling device 50 is connected to the free end of the mounting rod 125. A flame hardening burner 30 is connected to the free end of the cooling device 50. The flame hardening burner 30 and the cooling device 50 both consist of interconnected tube bends of an outer diameter in cross-section which is somewhat smaller than the inner diameter in cross-section of a tube bend 100 intended to be hardened so that the flame hardening burner 30 and the cooling device 50 may be introduced into the internal cavity of the tube bend 100. By means of the shaft 11, the mounting plate 20 and the mounting rod 125 the flame hardening burner 30 and the cooling device 50 may be moved along a circular path U corresponding to the mean radius of curvature of a tube bend 100 intended to be hardened whereby both devices may be moved through the internal cavity of the tube bend in the direction of the arrow X. The flame hardening burner 30 is separated from the cooling device 50 by a partition wall 160.

The flame hardening burner 30 may be of any suitable conventional design and includes a plurality of flame orifices radially spaced about its circumference so that the flames radially emerging from the flame hardening burner 30 will impinge on the inner wall surface of the tube bend 100 when introducing the flame hardening burner 30 into the internal cavity of the tube bend 100. The flame hardening burner 30 may be passed slowly through the internal cavity of the tube bend 100 until the cooling zone is about to enter the tube bend and will likewise be passed through the tube bend. Alternatively, the flame hardening burner 30 may be introduced in an inactive condition into the internal cavity of the tube bend 100 and subsequently put into service. The longitudinal extension of the flame hardening burner 30 would then substantially correspond to the longitudinal extension of the tube bend 100. The longitudinal extension of the cooling device 50 likewise substantially corresponds to the longitudinal extension of the tube bend 100 so that after introducing the flame hardening burner 30 into the internal cavity of the tube bend 100 the latter may be flame hardened along the full longitudinal extension of the inner surface of the tube bend. Upon completion of flame hardening, the entire movable assembly consisting of flame hardening burner 30 and cooling device 50 will be moved further in the direction of the arrow X in thereby introducing the cooling device 50 incrementally into the internal cavity of the tube bend 100.

The mounting rod 125 includes the supply lines V leading to the flame hardening burner 30 and to the cooling device 50. The cooling device 50 is supplied with pressurized cooling-water. As soon as the cooling device 50 has been introduced fully into the internal cavity of the tube bend 100, quenching has been achieved. Then the movable assembly consisting of flame hardening burner 30 and cooling device 50 is rotated in a sense opposite to the arrow X back into the initial position shown in FIG. 4. After mounting of another untreated tube bend within the mounting 150 the above described cycle may be repeated.

In the latter embodiment the flame hardening burner 30 may be moved together with the cooling device 50 along the circular path U which coincides with the radius of the center line of the tube bend 100.

The embodiment of the apparatus shown in FIG. 4 operates to harden the whole inner surface of the tube bend in one operation, i.e. all surface portions simultaneously by initially rotating the flame hardening burner 30 so that the burner extends with its full length within the internal cavity of the tube bend 100. Since the cooling region is disposed immediately behind the flame hardening burner 30, the tube bend may be quenched immediately after heating. Since the tube bend 100 is kept stationary in the position shown in FIG. 4 the cooling-water discharged from the cooling device 50 may flow downwardly and out of the tube bend so that no water will collect within the internal cavity of the tube bend. To this end, the mounting 150 is arranged to extend at an angle of approximately 10° or more relative to the vertical. That is, as will be clear from the drawing the mounting 150 is displaced counterclockwise about 10° from the 12 O'Clock position. This will insure that no undesired water accumulation occurs. As will also be clear from FIG. 2, the embodiment depicted therein should also be similarly arranged and although a 10° displacement is depicted it should be understood that a different angle, preferably 20°, may be selected so long as there is deviation from a directly upstanding vertical position of the mounting 150. In the preferred mode of operation of the embodiment of FIG. 4, the flame hardening burner 30, which is configured of an arcuate length equivalent to the length of the tube bend 100, is first inserted completely into the tube bend and flame hardening is accomplished by flames emitted in a radial direction around the circumference of the burner 30, as indicated at A. Subsequently, the burner 30 is removed from within the tube bend 100 by further clockwise rotation of the mounting rod 125 and the cooling device 50, which is also of an equivalent arcuate length with the tube bend 100, is inserted therein. Quenching is accomplished by cooling water discharged radially around the circumference of the cooling device 50, as indicated at B. Of course, it will be apparent that the mounting arrangement may be reversed and that the unitary member, comprising the burner 30 and the cooling device 50, may be held stationary while the tube bend 100 is moved relative thereto in order to effect the desired relative rotational movement therebetween.

I claim:
1. An apparatus for continuously surface hardening the inner surface of tube bends of a constant radius of curvature by means of flame hardening, said apparatus comprising a support frame, a shaft horizontally journalled in the support frame, at least one mounting bracket assembly mounted on the shaft and extending in a direction perpendicular thereof, the mounting bracket assembly including means for fastening a tube bend at one end, the free end of the mounting bracket assembly defining a circular path during rotary movement of the shaft, a stationary mounting bracket connected at one end to the support frame and mounting at its opposite end a flame hardening burner, the flame hardening burner adapted to be received within the internal cavity of the tube bend, the stationary mounting bracket adapted to include the supply lines leading to the flame hardening burner and being of an arcuate configuration of a radius corresponding to the radius of the circular path described by the tube bend during its movement.

2. An apparatus as defined in claim 1, wherein the flame hardening burner is releasably replaceably connected to the mounting bracket.

3. An apparatus as defined in claim 1, wherein the mounting bracket assembly for a tube bend furthermore mounts a cooling-water pipe in the vicinity of the inner circumferential tube bend portion, the cooling-water pipe including a plurality of cooling-water discharge nozzles directed towards the inner arc tube bend surface.

4. Apparatus for continuously surface hardening by means of flame hardening the inner surface of tube bends having a constant radius of curvature comprising flame hardening means having an arcuate configuration with a constant radius of curvature generally equivalent to the radius of curvature of said tube bends, and including means for emitting flames therefrom for flame hardening the inner surface of said tube bends, and means mounting said flame hardening means and said tube bends for rotative movement relative to each other about a center generally coincident with the center of said radii of curvature, said mounting means being arranged such that said relative rotative movement causes said flame hardening means to become positioned within said tube bends with their radii of curvature generally coincident in order to effect said flame hardening.

5. An apparatus as defined in claim 4, wherein the flame hardening burner means includes a plurality of flame orifices radially spaced about the circumference of the burner.

6. Apparatus for surface hardening the inner surface of tube bends of a constant radius of curvature by means of flame hardening comprising a support frame, a shaft rotatably journalled in said support frame, flame hardening burner means having an arcuate configuration with a constant radius of curvature generally equivalent to the radius of curvature of said tube bends and including means for emitting flames therefrom for flame hardening said tube bends, a mounting bracket assembly mounted for rotation with said shaft and having a free end defining a circular path during rotary motion of said shaft, a stationary mounting bracket connected at one end to said support frame and having an opposite end extending radially from said shaft, said free end of said mounting bracket assembly and said opposite end of said stationary mounting bracket being spaced from the center of rotation of said shaft a distance equivalent to the radii of curvature of said tube bend and said flame hardening burner means, said flame hardening burner means being mounted to one of said free end of said mounting bracket assembly and said opposite end of said stationary mounting bracket with said tube end being mounting to the other, rotation of said shaft operating to effect relative rotative movement between said flame hardening burner means and said tube end to bring said flame hardening burner means to be received within said tube bend to effect flame hardening of the inner surface thereof.

7. An apparatus as defined in claim 6, wherein the mounting bracket assembly includes a guide sleeve whereby the radial extension of the mounting bracket assembly is adjustable so as to adapt the same to the radius of curvature of the tube bend.

8. Apparatus according to claim 6 wherein said flame hardening burner means is mounted to said free end of said mounting bracket assembly and wherein said tube bend is mounted to said opposite end of said stationary mounting bracket.

9. Apparatus according to claim 8 wherein said stationary mounting bracket extends radially from said shaft at an angle offset from a directly upstanding vertical position.

10. Apparatus according to claim 9 wherein said offset angle of said stationary mounting bracket is between about 10° to 20° from the vertical position.

11. Apparatus according to claim 6 wherein said tube bend is mounted to said free end of said mounting bracket assembly and wherein said flame hardening burner means is mounted to said opposite end of said stationary mounting bracket.

12. Apparatus according to claim 6 wherein said flame hardening burner means comprise a flame hardening burner and a cooling device each having an arcuate length generally equivalent to the length of said tube bend and extending through an arc having a constant radius of curvature generally equivalent to that of said tube bend, said flame hardening burner means and said cooling means being connected end to end to form a unitary member in an arrangement such that relative rotative movement between said tube bend and said unitary member operates to first bring said flame hardening burner into said tube bend followed by said cooling means.

* * * * *